(12) United States Patent
Arimoto

(10) Patent No.: US 8,212,786 B2
(45) Date of Patent: *Jul. 3, 2012

(54) IMAGE-SELECTING DEVICE AND STORAGE MEDIUM STORING IMAGE-SELECTING PROGRAM

(75) Inventor: Hideki Arimoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 725 days.

This patent is subject to a terminal disclaimer.

(21) Appl. No.: 12/213,130

(22) Filed: Jun. 16, 2008

(65) Prior Publication Data

US 2008/0309643 A1    Dec. 18, 2008

(30) Foreign Application Priority Data

Jun. 14, 2007  (JP) ................. P2007-157011
Jun. 19, 2007  (JP) ................. P2007-161831

(51) Int. Cl.
*G06F 3/041* (2006.01)

(52) U.S. Cl. ........................ 345/173; 715/823

(58) Field of Classification Search .......... 345/173–178, 345/179; 715/700, 764, 810, 821, 823, 831, 715/835, 838, 845, 846; 178/18.01–18.09, 178/18.11, 19.01–19.07
See application file for complete search history.

(56) References Cited

U.S. PATENT DOCUMENTS

| 7,176,899 | B2 | 2/2007 | Nagasaka et al. | |
|---|---|---|---|---|
| 2004/0021701 | A1* | 2/2004 | Iwema et al. | ................. 345/863 |
| 2004/0046886 | A1 | 3/2004 | Ambiru et al. | |
| 2007/0229471 | A1* | 10/2007 | Kim et al. | .................... 345/173 |

FOREIGN PATENT DOCUMENTS

| JP | 10-63409 | | 3/1998 |
|---|---|---|---|
| JP | 2001-175407 | A | 6/2001 |
| JP | 2004-152171 | A | 5/2004 |
| JP | 2005-072758 | A | 3/2005 |
| JP | 2005-92386 | | 4/2005 |
| JP | 2006-163805 | A | 6/2006 |
| JP | 2006-319389 | | 11/2006 |

OTHER PUBLICATIONS

Japan Patent Office, Office Action for Japanese Patent Application No. 2007-157011 (counterpart to above-captioned patent application), mailed Feb. 15, 2011.

* cited by examiner

*Primary Examiner* — Stephen Sherman
(74) *Attorney, Agent, or Firm* — Baker Botts L.L.P.

(57) ABSTRACT

An image data identifying unit identifies at least two pieces of image data for images displayed in display regions detected by a detecting unit. The at least two pieces of image data includes a first image data firstly identified by the image data identifying unit. An image data selecting unit selects or deselects the at least two pieces of image data identified by the image data identifying unit. A selection data storing unit stores selection data for each of the plurality of pieces of image data read by a reading unit. The selection data indicates whether each of the plurality of pieces of image data is in a selected state or a deselected state by the image data selecting unit. A determining unit determines whether the first image data is in the selected state or the deselected state based on the selection data. The image data selecting unit sets the at least two image data to the selected state when the determining unit determines that the first image data is in the deselected state, and sets the at least two image data to the deselected state when the determining unit determines that the first image data is in the selected state.

4 Claims, 13 Drawing Sheets

FIG.3A

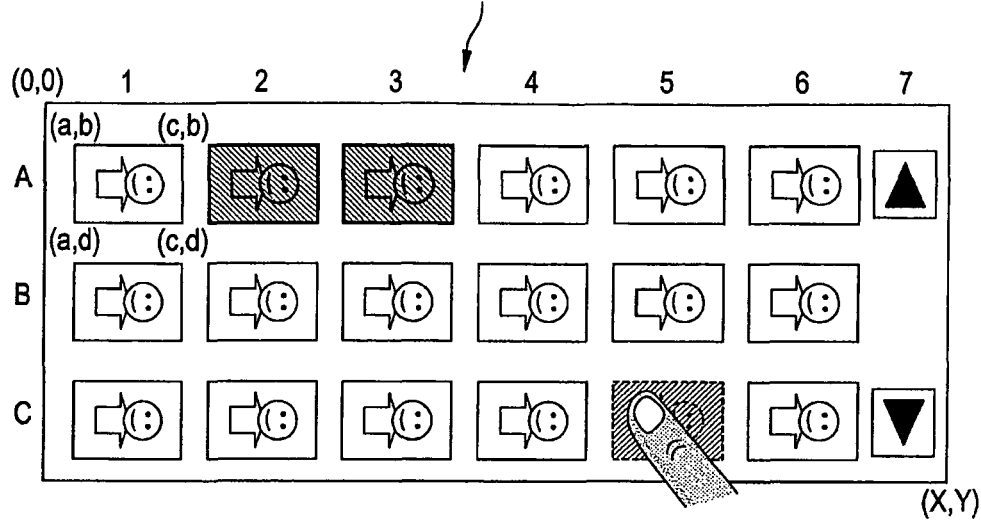

SAMPLE RELATIONSHIP BETWEEN THUMBNAILS DISPLAYED ON LCD 16 AND THEIR DISPLAY POSITION NUMBERS

FIG.3B

SAMPLE CONTENT OF THUMBNAIL LIST MEMORY AREA 13B

| DISPLAY POSITION NUMBER | IMAGE FILENAME | SELECTION STATUS FLAG |
|---|---|---|
| A1 | PHOTO1.JPG | × |
| A2 | PHOTO2.JPG | ○ |
| A3 | PHOTO3.JPG | ○ |
| A4 | PHOTO4.JPG | × |
| A5 | PHOTO5.JPG | × |
| A6 | PHOTO6.JPG | × |
| ⋮ | ⋮ | ⋮ |

○···SELECTED
×···UNSELECTED

FIG.3C

SAMPLE CONTENT OF TEMPORARY SELECTION LIST MEMORY AREA 13C

| DISPLAY POSITION NUMBER |
|---|
| C5 |

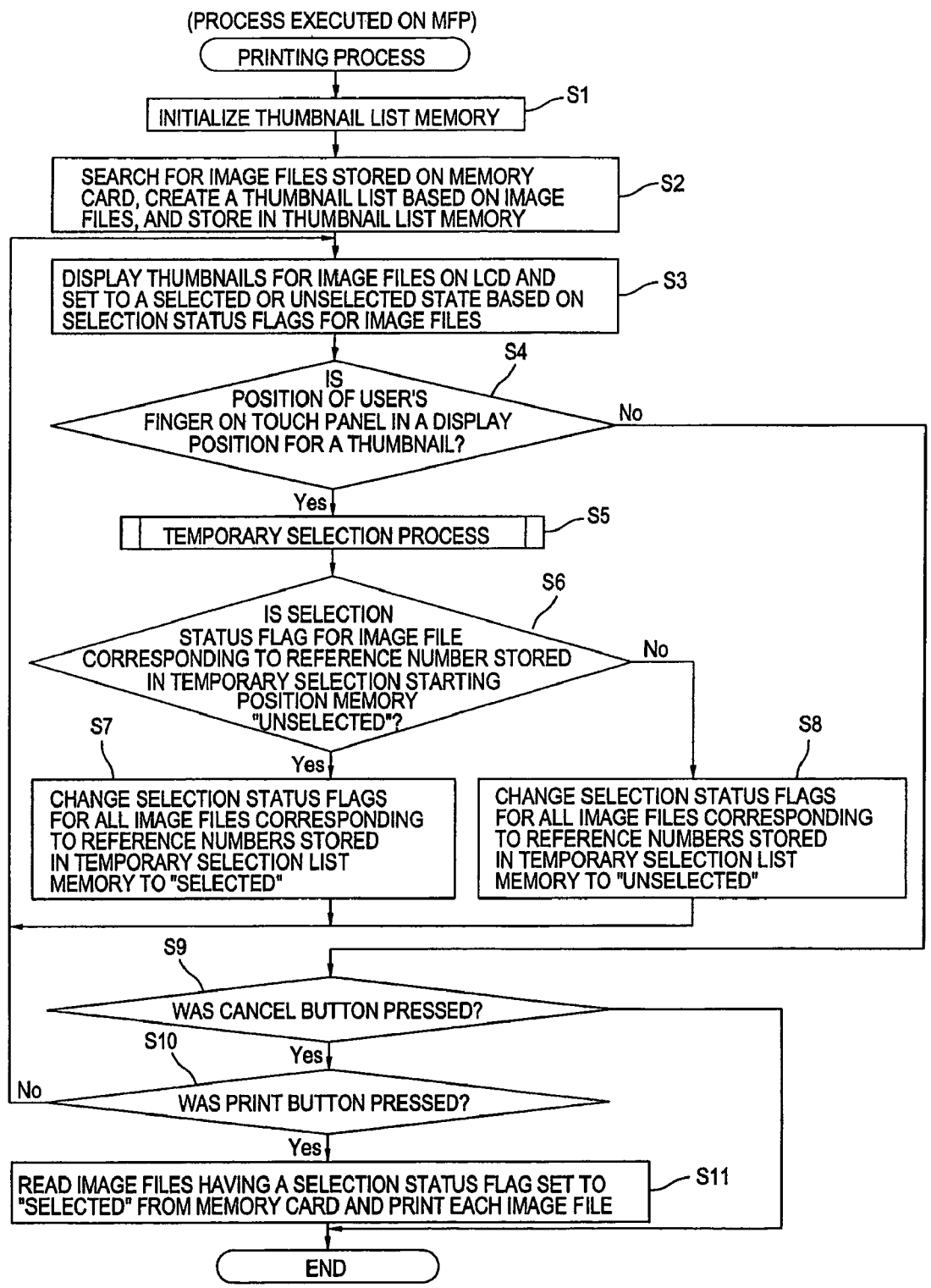

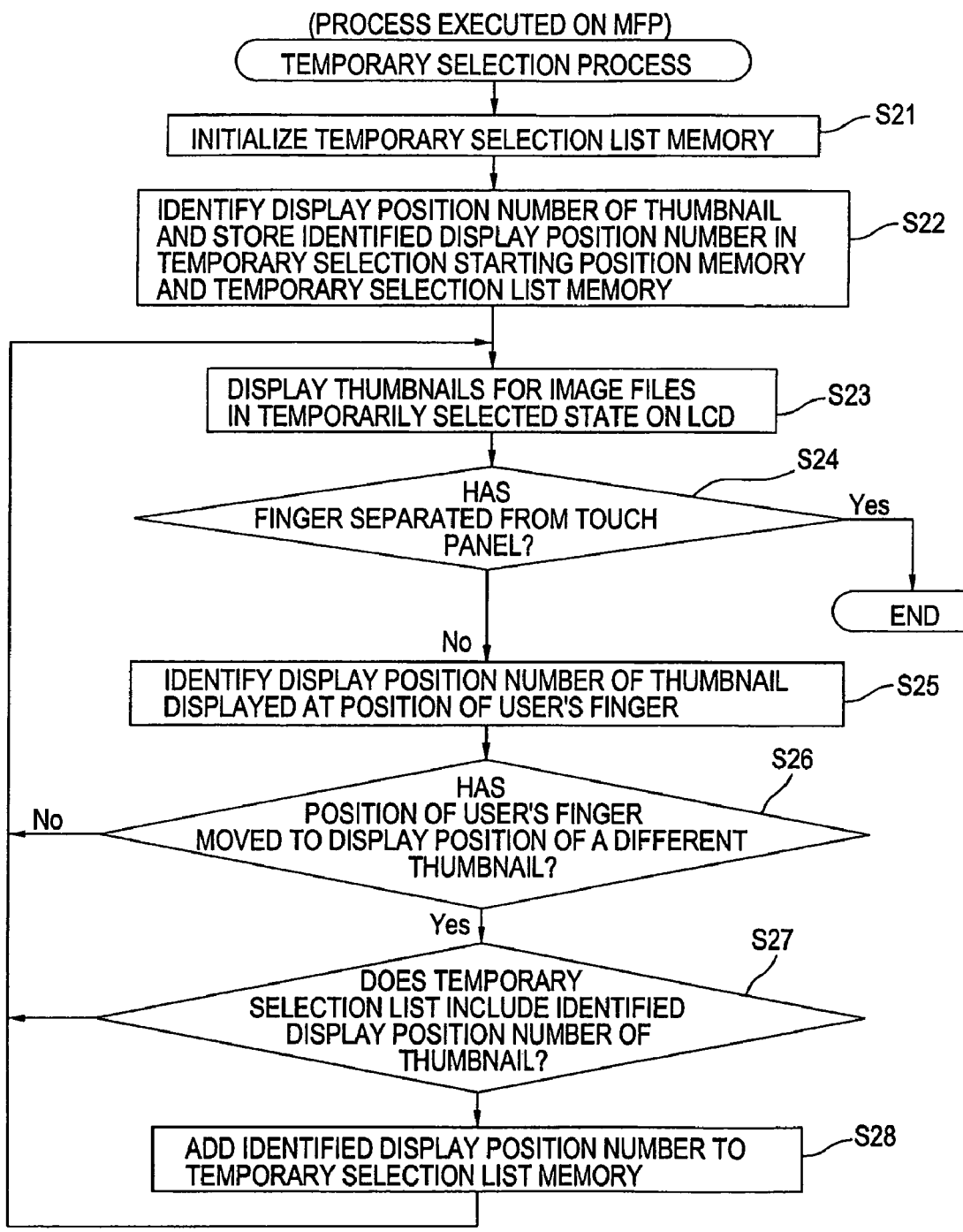

SAMPLE CONTENT OF THUMBNAIL LIST MEMORY AREA 13B

SAMPLE CONTENT OF THUMBNAIL LIST MEMORY AREA 13B

SAMPLE CONTENT OF TEMPORARY SELECTION LIST MEMORY AREA 13C

| DISPLAY POSITION NUMBER |
|---|
| NONE |

SAMPLE CONTENT OF TEMPORARY SELECTION LIST MEMORY AREA 13C

| DISPLAY POSITION NUMBER |
|---|
| A2 |

SAMPLE CONTENT OF TEMPORARY SELECTION LIST MEMORY AREA 13C

| DISPLAY POSITION NUMBER |
|---|
| A2 |
| A3 |
| A4 |
| B4 |
| C4 |

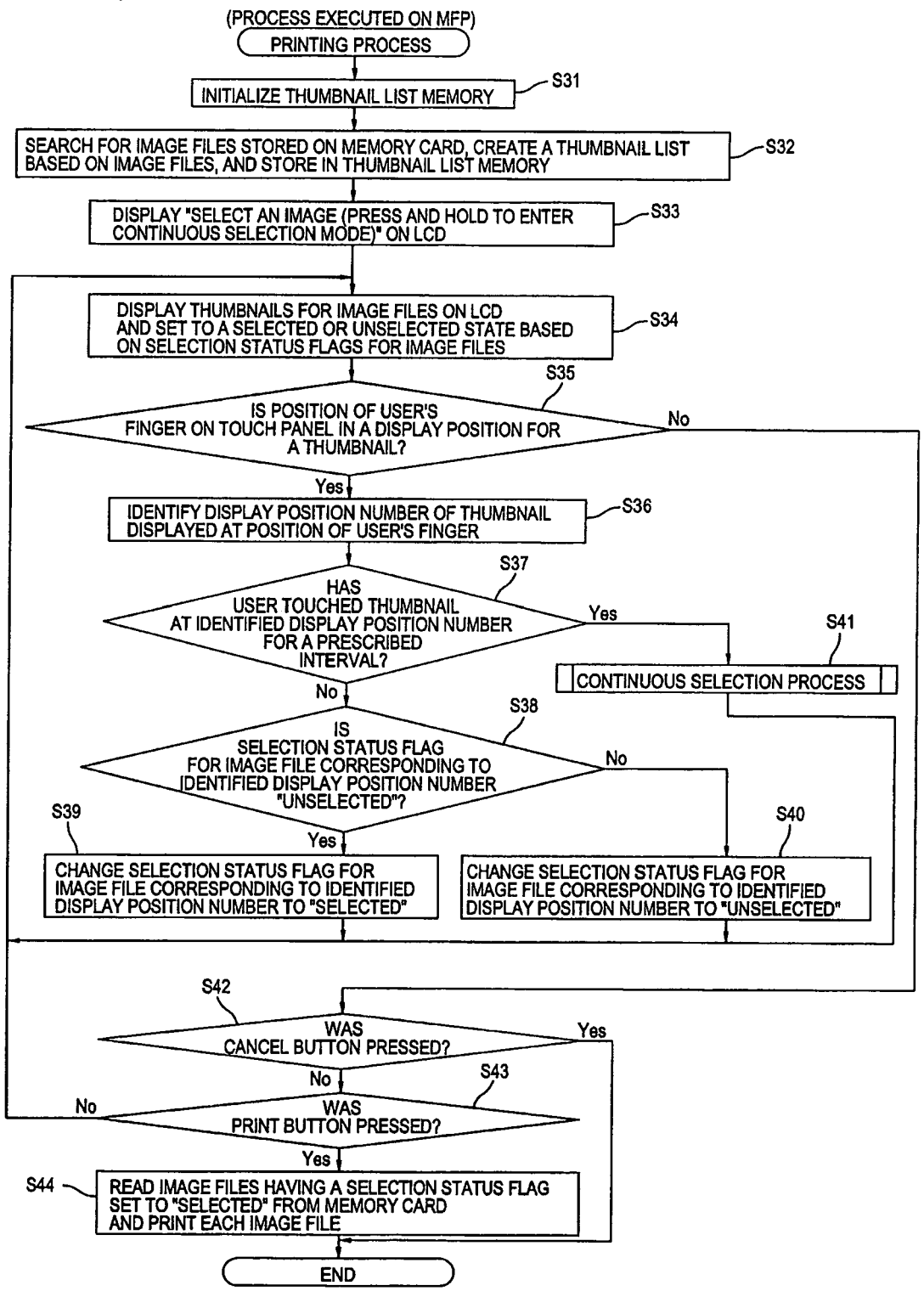

SAMPLE CONTENT OF THUMBNAIL LIST MEMORY AREA 13B

SAMPLE CONTENT OF THUMBNAIL LIST MEMORY AREA 13B

IMAGE-SELECTING DEVICE AND STORAGE MEDIUM STORING IMAGE-SELECTING PROGRAM

CROSS REFERENCE TO RELATED APPLICATION

This application claims priority from Japanese Patent Applications No. 2007-157011 filed Jun. 14, 2007 and No. 2007-161831 filed Jun. 19, 2007. The entire contents of the priority applications are incorporated herein by reference.

TECHNICAL FIELD

The present invention relates to an image-selecting device and an image-selecting method. More particularly, the present invention relates to an image-selecting device and a storage medium storing an image-selecting program enabling the user to select or deselect a plurality of desired image data from a plurality of images displayed on a display device through simple operations.

BACKGROUND

There is known an image-selecting device that is provided with a touch panel arranged on a display screen on a display on which a plurality of images are displayed. Then, when a user touches the touch panel by a finger, an image corresponding to the touched position on the touch panel is selected. Japanese Patent Application Publication No. 2005-92386 discloses that an image-selecting device is capable of selecting the image data for the images in a path traced by the finger from a position where the finger touches the touch panel to a position where the finger is removed from the touch panel.

SUMMARY

However, with the technique described in Japanese Patent Application Publication No. 2005-92386, the user can only select the image data and cannot deselect the selected image data. A solution to this problem may be providing buttons for indicating selection of image data and deselection of image data so that the user may touch the touch panel after specifying selection or deselection by way of the corresponding one of the buttons. Then, the user can select (or deselect) the image data of the images in which the user traces a path over the images while touching the touch panel. However, this arrangement requires a cumbersome operation. In other words, the user is required to combine an operation for indicating selection of image data or deselection of image data and an operation for touching the image of the image data, thereby resulting in tedious operations and unavailability for the user.

Additionally, in case image data of images in the path traced by the finger on the touch panel are deselected when the image data has already been selected but are selected when the image data has not been selected yet. In this case, if the user touches an unselected image when the user traces the touch panel in order to deselect images, the touched unselected image is selected.

In view of the forgoing, it is an object of the present invention to provide an image-selecting device and a storage medium storing an image-selecting program enabling the user to select or deselect a plurality of desired image data from a plurality of images displayed on a display device through simple operations.

To achieve the above and other objects, one aspect of the invention provides an image-selecting device including a storing unit, a displaying unit, a detecting unit, a reading unit, a display controlling unit, an image data identifying unit, an image data selecting unit, a selection data storing unit, and a determining unit. The storing unit stores a plurality of pieces of image data. The displaying unit displays a plurality of images based on the plurality of pieces of image data and has a plurality of display regions for each of the plurality of images. The detecting unit detects each of the plurality of display regions receiving direct input by an indicator. The reading unit reads the plurality of pieces of image data from the storing unit. The display controlling unit controls the displaying unit to display the plurality of images. The image data identifying unit identifies at least two pieces of image data for the images displayed in the display regions detected by the detecting unit. The image data selecting unit selects or deselects the at least two pieces of image data identified by the image data identifying unit. The selection data storing unit stores selection data for each of the plurality of pieces of image data read by the reading unit. The selection data indicates whether each of the plurality of pieces of image data is in a selected state or a deselected state by the image data selecting unit. The determining unit determines whether a first image data firstly identified by the image data identifying unit among the at least two pieces of image data is in the selected state or the deselected state based on the selection data. The image data selecting unit sets the at least two image data to the selected state when the determining unit determines that the first image data is in the deselected state, and sets the at least two image data to the deselected state when the determining unit determines that the first image data is in the selected state.

In another aspect of the present invention, there is provided a computer-readable storage medium storing a computer-executable image-selecting program for an image-selecting device. The image-selecting device includes a storing unit that stores a plurality of pieces of image data, a displaying unit that displays a plurality of images based on the plurality of pieces of image data and has a plurality of display regions for each of the plurality of images, and a detecting unit that detects each of the plurality of display regions receiving direct input by an indicator. The image-selecting program includes:

instructions for reading the plurality of pieces of image data from the storing unit;

instructions for controlling the displaying unit to display the plurality of images;

instructions for identifying at least two pieces of image data for the images displayed in the display regions detected by the detecting unit;

instructions for selecting or deselecting the at least two pieces of image data identified in the identifying instructions;

instructions for storing selection data for each of the plurality of pieces of image data read in the plurality of pieces of image data reading instructions, the selection data indicating whether each of the plurality of pieces of image data is in a selected state or a deselected state in the selecting or deselecting instructions; and instructions for determining whether first image data firstly identified by the identifying instructions among the at least two pieces of image data is in the selected state or the deselected state based on the selection data, wherein the selecting or deselecting instructions sets the at least two image data to the selected state when the determining instructions determines that the first image data is in the unselected state, and sets the at least two image data to the unselected state when the determining instructions determines that the first image data is in the selected state.

BRIEF DESCRIPTION OF THE DRAWINGS

In the drawings:

FIG. 3A is an explanatory diagram showing a sample relationship between thumbnails of image files displayed on an LCD and their display position numbers;

FIG. 3B is a table showing sample content of a thumbnail list stored in a thumbnail list memory area;

FIG. 3C is a table showing sample content of a temporary selection list stored in a temporary selection list memory area;

FIG. 4 is a flowchart illustrating steps in a printing process performed on the multifunction peripheral according to the first embodiment;

FIG. 5 is a flowchart illustrating steps in a temporary selection process performed on the multifunction peripheral;

FIG. 9 is a flowchart illustrating steps in a printing process executed by the multifunction peripheral according to a second embodiment;

DETAILED DESCRIPTION

Figure 1:
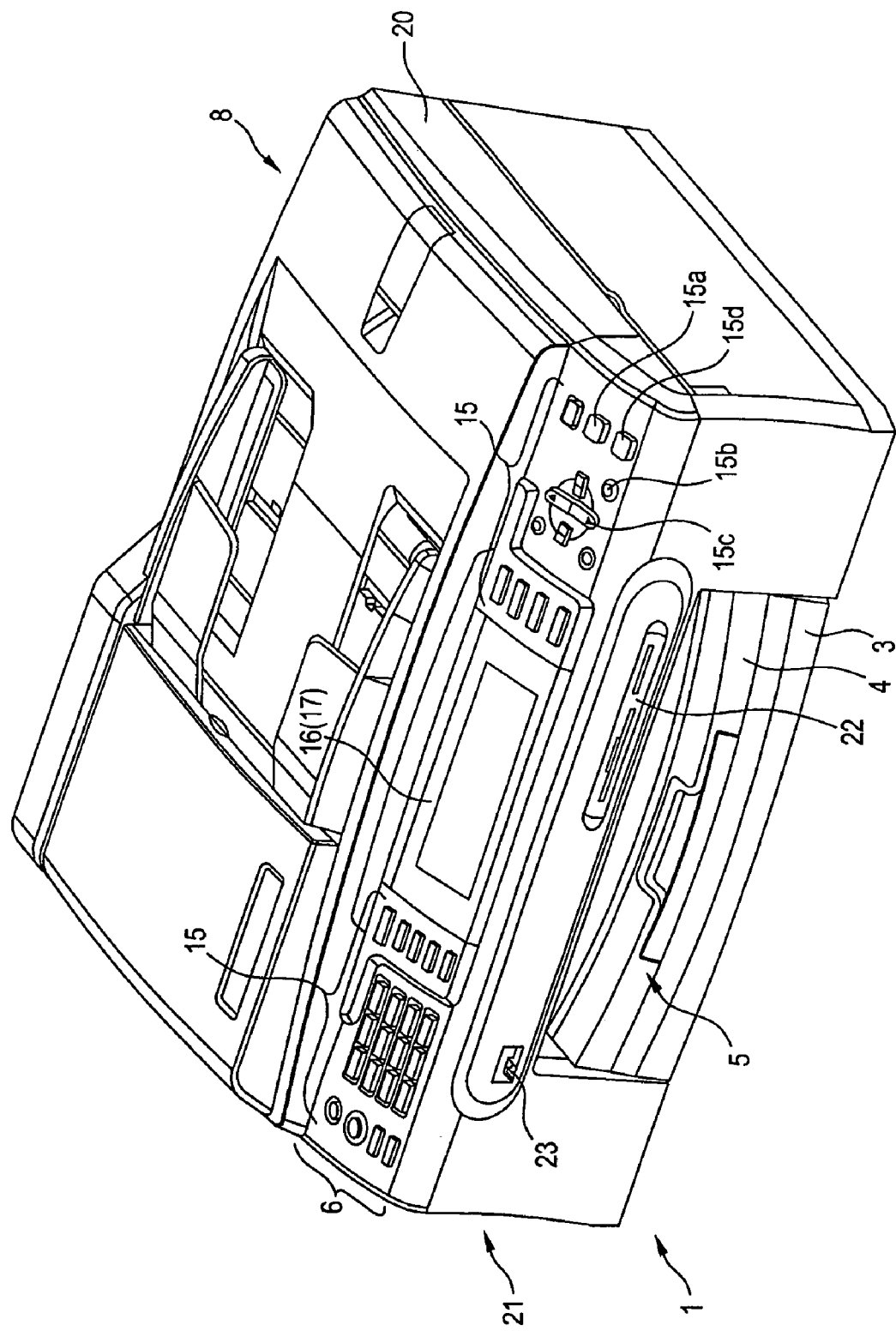
FIG. 1 is a perspective view showing the external structure of a multifunction peripheral according to a first embodiment of the present invention.

Next, a first embodiment of the present invention will be described while referring to the accompanying drawings. FIG. 1 is a perspective view showing the external structure of a multifunction peripheral (hereinafter abbreviated to "MFP") 1 having an image-selecting device according to the embodiment of the present invention.

As shown in FIG. 1, the MFP 1 is integrally provided with a printer 21 disposed in a lower section thereof, a scanner 20 disposed in an upper section thereof, and a control panel 6 disposed on the front surface of the scanner 20. Through these components, the MFP 1 implements various functions, including a printer function, scanner function, and copier function.

The scanner 20 includes a document scanning bed (not shown), and a document cover 8 rotatably attached to the document scanning bed via hinges provided on the rear side.

The printer 21 functions to record images on printing paper. An opening 5 is formed in the front surface of the MFP 1, and specifically in the front surface of the printer 21. A paper tray 3 and a discharge tray 4 are disposed in the opening 5 so as to be completely accommodated therein. The paper tray 3 and discharge tray 4 are arranged in two levels vertically, with the discharge tray 4 disposed above the paper tray 3.

Memory card slots 22 are provided in the front surface of the printer 21 above the opening 5. The memory card slots 22 accept the insertion of memory cards 22a (see FIG. 2). When a memory card 22a is inserted into one of the memory card slots 22, the MFP 1 can store image data scanned by the scanner 20 in the memory card 22a as an image file. Some examples of the types of memory cards 22a that may be inserted into the memory card slots 22 include CompactFlash (registered trademark), SmartMedia (registered trademark), Memory Stick (registered trademark), SD Card (registered trademark), and xD Card (registered trademark).

The connector of a USB interface 23 is also exposed in the front surface of the printer 21 above the opening 5. The MFP 1 can be connected to a personal computer (hereinafter abbreviated to "PC") by inserting one end of a USB cable (not shown) into the connector of the USB interface 23 and the other end of the USB cable into the connector of a USB interface provided in the PC, enabling the MFP 1 and the PC to communicate via the USB cable. The method of connecting the PC and the memory card 22a to the MFP 1 is not limited to a specific interface (i.e., the USB interface 23 and the memory card slots 22), but may be established through another type of interface, such as a parallel interface or network interface, provided in the MFP 1. Further, if the memory card 22a is connected to a card slot or USB interface provided in another device, the MFP 1 may connect to the memory card 22a via the above interfaces.

Figure 2:
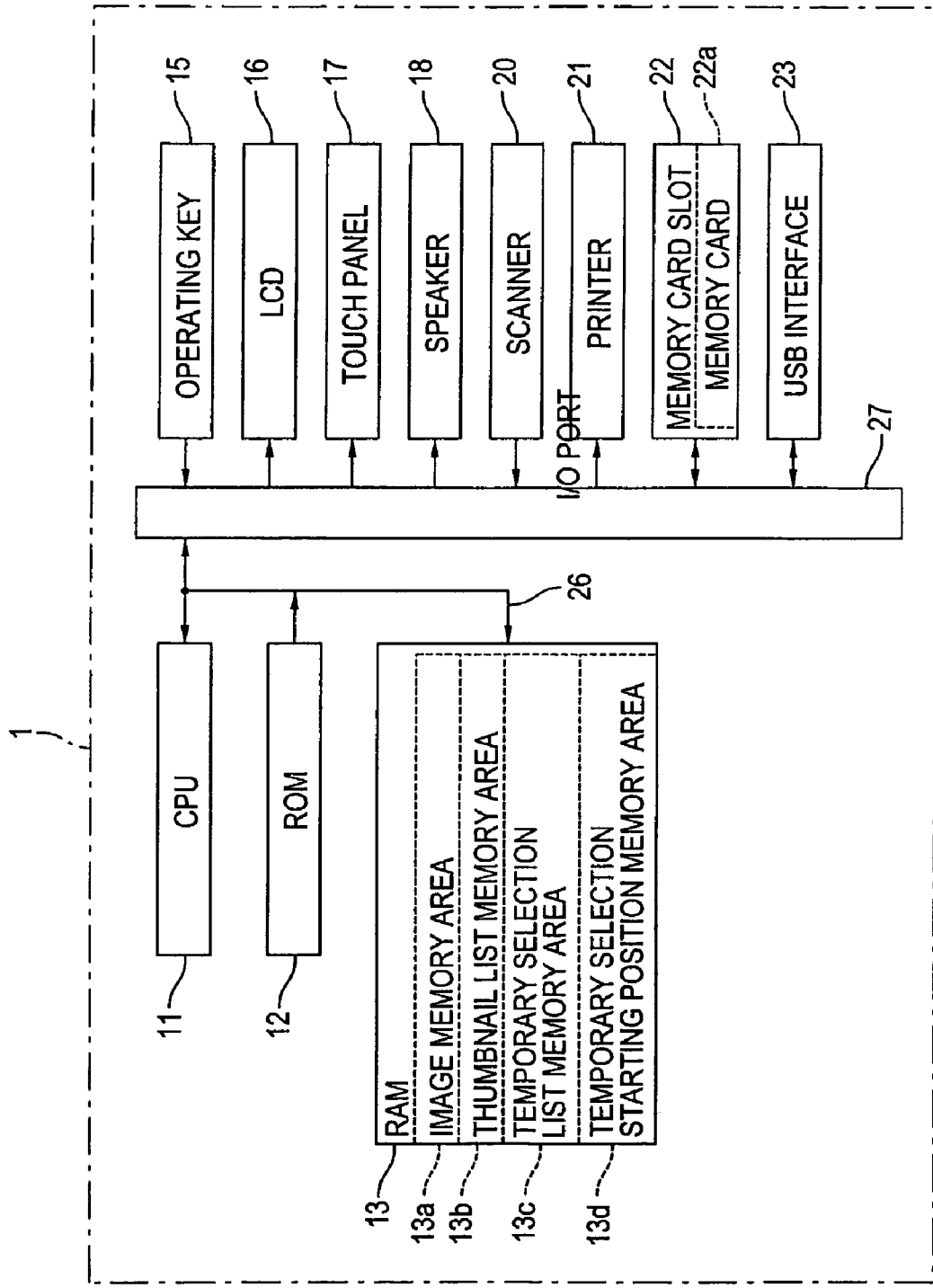
FIG. 2 is a block diagram showing the electrical structure of the multifunction peripheral.

The control panel 6 provided on the front of the document cover 8 has a laterally elongated rectangular shape and includes operating keys 15, an LCD 16, a touch panel 17, and a speaker 18 (see FIG. 2).

The operating keys 15 allow the user to input commands and data for controlling the MFP 1. In this embodiment, the operating keys 15 include a Print Image File button 15a, a Cancel button 15b, and a Print button 15c.

The touch panel 17 is an input device superposed over the surface of the LCD 16. The user touches the touch panel 17 to select images and the like displayed on the LCD 16. For example, when thumbnail images (hereinafter simply referred to as "thumbnails") are displayed on the LCD 16 and the user touches the touch panel 17, the touch panel 17 identifies a thumbnail displayed at a display position on the LCD 16 corresponding to the touched position.

Here, the touch panel 17 is not limited to any particular position detecting method. For example, the MFP 1 may employ a touch panel using a pressure sensor for detecting pressure by the user's finger or an indicating device, or a touch panel employing an infrared or electric field sensor detecting proximity of a finger or indicating device.

The speaker 18 issues notifications to the user in the form of operating sounds when the user presses the operating keys 15, or warning sounds when errors occur. With the MFP 1 having the above construction, if the user presses the Print Image File button 15a while a memory card 22a storing image files is inserted into one of the memory card slots 22 provided in the front surface of the MFP 1, the MFP 1 reads all image data stored on the memory card 22a and displays thumbnails of the image data on the LCD 16. Here, thumbnails are small images formed by reducing the image files.

At this time, the user can touch the touch panel 17 with a finger to indicate a desired thumbnail among thumbnails displayed on the LCD 16. When the user touches a thumbnail on the LCD 16, the printer 21 is configured to print the image from the image file corresponding to the touched thumbnail on printing paper.

Next, the electrical structure of the MFP 1 will be described with reference to FIG. 2. FIG. 2 is a block diagram showing this electrical structure. As shown in FIG. 2, the MFP 1 is primarily configured of a CPU 11, a ROM 12, a RAM 13, the operating keys 15, the LCD 16, the touch panel 17, the speaker 18, the scanner 20, the printer 21, the memory card slots 22, and the USB interface 23. The CPU 11, ROM 12, and RAM 13 are interconnected via a bus line 26.

Further, the bus line 26 is connected to the operating keys 15, LCD 16, touch panel 17, speaker 18, scanner 20, printer 21, memory card slots 22, and USB interface 23 via an I/O port 27.

The CPU 11 of the MFP 1 serves to control the various functions of the MFP 1 based on fixed values and programs stored in the ROM 12 and RAM 13 and to control each component of the MFP 1 connected to the I/O port 27 based on various signals exchanged with the USB interface 23.

The ROM 12 is a non-rewritable memory storing control programs and the like executed on the MFP 1. The image selection program shown in the flowcharts of FIGS. 4, 6, 9, and 10 is also stored in the ROM 12.

The RAM 13 is a nonvolatile rewritable memory for temporarily storing various data when the CPU 11 executes operations of the MFP 1. The RAM 13 is provided with an image memory area 13a storing image files acquired from the memory card 22a for images to be printed by the printer 21 on printing paper; a thumbnail list memory area 13b storing a thumbnail list including such data as the filenames and display position numbers described later of image files stored in the memory card 22a; a temporary selection list memory area 13c storing display position numbers of image files identified when the user touches the touch panel 17 in a temporary selection process described later (see FIG. 5) as a temporary selection list; and a temporary selection starting position memory area 13d storing the display position number of the image file initially identified in the temporary selection process.

Next, the thumbnail list memory area 13b, temporary selection list memory area 13c, and temporary selection starting position memory area 13d will be described with reference to FIGS. 3A-3C.

FIG. 3A is an explanatory diagram conceptually illustrating an example of relationships between thumbnails for image files displayed on the LCD 16 and display position numbers. FIG. 3B is a table conceptually illustrating sample content of a thumbnail list stored in the thumbnail list memory area 13b. FIG. 3C is an explanatory diagram conceptually illustrating sample content of a temporary selection list stored in the temporary selection list memory area 13c.

The display position numbers for thumbnails displayed on the LCD 16 will be described with reference to FIG. 3A. As shown in FIG. 3A, a total of eighteen thumbnails arranged in three rows and six columns are displayed on the LCD 16.

To simplify the description of display positions for thumbnails displayed on the LCD 16, the display position of the thumbnails will be referred to based on a combination of a letter and number, where letters from "A" to "C" indicate the rows of thumbnails in order from top to bottom and numbers from "1" to "6" indicate the columns of thumbnails in order from left to right. The combination of letters and numbers will be referred to in the following description as the display position number. For example, "A1" denotes the display position number of the thumbnail displayed in the first row and first column, and "C6" denotes the display position number of the thumbnail displayed in the third row and sixth column.

Coordinates for a two-dimensional rectangular shape are established for the LCD 16 and the touch panel 17 superposed over the surface of the LCD 16, with (0, 0) being the point of origin in the upper left corner and (X, Y) being the ending point in the lower right corner. Each of the display position numbers "A1-C6" described above is associated with separate coordinate positions on the LCD 16.

For example, the display position number "A1" is associated with a rectangular display region whose four vertices have coordinates (a, b), (a, d), (c, b), and (c, d). A thumbnail is displayed within this display region. In the same way, each of the other display position numbers "A2-C6" is associated with a separate rectangular display region. When the user touches one of the thumbnails displayed on the LCD 16, the user actually touches the touch panel 17 superposed over the LCD 16. The touch panel 17 detects the coordinates at the touched position, enabling the MFP 1 to identify the position display number of the thumbnail displayed in a position on the LCD 16 corresponding to the touched coordinates. Thus, the MFP 1 can identify the image file displayed in the position display number.

For example, when the user touches a position on the touch panel 17 within the rectangular region whose four vertices have coordinates (a, b), (a, d), (c, b), and (c, d), the MFP 1 identifies display position number "A1" of the thumbnail displayed in a position on the LCD 16 corresponding to the touched coordinates, thereby the image file corresponding to the thumbnail displayed at the display position number "A1".

FIG. 3B conceptually illustrates sample content of a thumbnail list stored in the thumbnail list memory area 13b. When the MFP 1 executes a printing process described later with reference to FIG. 4, the MFP 1 searches for all image files stored in the memory card 22a. Subsequently, the MFP 1 creates a thumbnail list that includes the filename, display position number, and other data for each image file found when searching the memory card 22a and stores this thumbnail list in the thumbnail list memory area 13b.

As shown in FIG. 3B, the thumbnail list is configured of the display position numbers indicating display positions of thumbnails on the LCD 16, filenames of the image files, and selection status flags indicating whether the image files are selected or unselected. Each row in the thumbnail list corresponds to a single image file.

The display position numbers "A1-C6" are set to the display position numbers of the thumbnail list with no duplication. As the display position numbers is set in the thumbnail list, a thumbnail of an image file is displayed in the display position of the LCD 16 indicated by the display position number.

The selection status flag indicates whether the image file is "selected" or "unselected." When the selection status flag is "selected," the thumbnail of the image file is highlighted on the LCD 16, as are thumbnails at display position numbers "A2" and "A3" in the example of FIG. 3A. When the selection status flag is set to "unselected" or is modified from "selected" to "unselected," the corresponding thumbnail displayed on the LCD 16 is not highlighted, as in the thumbnail at display position number "A1" in the example of FIG. 3A. In the following description, highlighted thumbnails will be referred to as thumbnails displayed in a selected state, while unhighlighted thumbnails will be referred to as thumbnails displayed in an unselected state.

FIG. 3C is an explanatory diagram conceptually illustrating sample content of the temporary selection list stored in the temporary selection list memory area 13c. When the user touches the touch panel 17, the MFP 1 identifies the display position of the thumbnail displayed on the LCD 16 at a position identical to the coordinate position touched on the touch panel 17. Further, if the user continues to touch the touch panel 17 with a finger while moving the position of the finger, the MFP 1 identifies the display position number of the thumbnail displayed at the position of the LCD 16 having coordinates corresponding to the coordinate position of the moved finger.

The temporary selection list memory area 13c stores all display position numbers of the thumbnails identified while the user's finger was touching the touch panel 17. The temporary selection starting position memory area 13d stores the display position number of the thumbnail initially identified while the user's finger was touching the touch panel 17. The thumbnails for image files corresponding to display position numbers stored in the temporary selection list memory area 13c are displayed on the LCD 16 in a format different from that for selected and unselected thumbnails, such as the format for the thumbnail at display position number "C5" in the example of FIG. 3A. In the following description, thumbnails in this format differing from the format for selected and unselected thumbnail displays will be referred to as thumbnails displayed in a temporarily selected state.

For example, if the user touches the thumbnail at display position number "C5" on the touch panel 17, as shown in FIG. 3A, the display position number "C5" of the touched thumbnail is stored in both the temporary selection starting position memory area 13d and the temporary selection list memory area 13c. As long as the user continues to touch the touch panel 17, the thumbnail for the image file corresponding to the display position number "C5" stored in the temporary selection list memory area 13c is displayed on the LCD 16 in the temporarily selected state.

Next, the printing process executed by the CPU 11 of the MFP 1 will be described with reference to FIG. 4. FIG. 4 is a flowchart illustrating steps in this printing process and is executed when the user presses the Print Image File button 15a while a memory card 22a is inserted into one of the memory card slots 22.

In this printing process, the user can select desired image files from those stored in the memory card 22a through simple operations and direct the printer 21 to print images on printing paper based on the selected image files. Accordingly, the MFP 1 can select desired image files from those stored in the memory card 22a through simple operations and direct the printer 21 to print images on printing paper based on the selected image files.

In S1 of the printing process, the CPU 11 initializes the thumbnail list memory area 13b. In S2 the CPU 11 searches the memory card 22a for all image files, creates a thumbnail list based on the image files found in this search, and stores the thumbnail list in the thumbnail list memory area 13b. When the thumbnail list is created (i.e., when in its initial state), selection status flags for all image files are set to "unselected."

In S3 the CPU 11 displays thumbnails on the LCD 16 for image files corresponding to display position numbers "A1-C6" in the thumbnail list stored in the thumbnail list memory area 13b and sets each thumbnail to the selected state or the unselected state based on the selection status flag for the corresponding image file.

In S4 the CPU 11 determines whether the position of the user's fingers touching the touch panel 17 is a display position on the LCD 16 for displaying a thumbnail. If the position of the user's finger on the touch panel 17 is a display position for a thumbnail (S4: YES), the CPU 11 executes a temporary selection process in S5. However, if the position of the user's finger does not correspond to a display position for a thumbnail (S4: NO), the CPU 11 skips S5-S8 and advances to S9.

Here, the temporary selection process of S5 will be described with reference to FIG. 5. FIG. 5 is a flowchart illustrating steps in the temporary selection process and serves to determine display position numbers of image files whose selection status flags have changed in the thumbnail list and the range of display position numbers for image files whose selection status flags have changed based on the position of the user's finger on the touch panel 17. During the period that the CPU 11 is executing the temporary selection process, thumbnails for image files corresponding to display position numbers stored in the temporary selection list memory area 13c are set to the temporarily selected state on the LCD 16.

In S21 at the beginning of the temporary selection process, the CPU 11 initializes the temporary selection list memory area 13c. In S22 the CPU 11 identifies the display position number of the thumbnail displayed at the display position on the LCD 16 identical to the position of the user's finger on the touch panel 17 and stores the identified display position number of the image file in both the temporary selection starting position memory area 13d and the temporary selection list memory area 13c. In S23 the CPU 11 sets only thumbnail of image file corresponding to the display position number stored in the temporary selection list memory area 13c to the temporarily selected state on the LCD 16.

In S24 the CPU 11 determines whether the user's fingers has separated from the touch panel 17. If the user's finger has separated from the touch panel 17 (S24: YES), the CPU 11 ends the temporary selection process and advances to S6 in FIG. 4.

However, if the user's finger is still touching the touch panel 17 (S24: NO), in S25 the CPU 11 identifies the display position number of the thumbnail at the display position on the LCD 16 corresponding to the position of the user's finger on the touch panel 17.

In S26 the CPU 11 determines whether the position of the user's finger on the touch panel 17 has moved to the display position of a different thumbnail. If the user's finger has moved to the display position of a different thumbnail (S26: YES), then in S27 the CPU 11 determines whether the display position number identified in S25 is included in the temporary selection list in the temporary selection list memory area 13c. On the other hand, if the CPU 11 determines in S26 that the position of the user's finger touching the touch panel 17 has not moved to the display position of a different thumbnail (S26: NO), then the CPU 11 returns to S23 and repeats the process in S23-S26 described above.

If the CPU 11 determines in S27 that the display position number identified in S25 is included in the temporary selection list stored in the temporary selection list memory area 13c (S27: YES), then the CPU 11 returns to S23 and repeats the process in S23-S27 described above. On the other hand, if the CPU 11 determines in S27 that the display position number identified in S25 is not included in the temporary selection list stored in the temporary selection list memory area 13c (S27: NO), in S28 the CPU 11 adds the display position number identified in S25 to the temporary selection list stored in the temporary selection list memory area 13c, and returns to S23 to repeat the process in S23-S28 described above.

Through the temporary selection process of S5 shown in FIG. 5, the MFP 1 can specify either a display position number for an image file whose selection status flag has changed in the thumbnail list, or a range of display position numbers for image files whose selection status flags have changed, based on the position of the user's finger on the touch panel 17. Further, while executing the temporary selection process, the MFP 1 can display thumbnails of image files corresponding to display position numbers stored in the temporary selection list memory area 13c in temporarily selected state on the LCD 16. After completing the temporary selection process of S5, the CPU 11 returns to FIG. 4 and advances to S6.

In S6 of FIG. 4 the CPU 11 determines whether the selection status flag for the image file corresponding to the display position number stored in the temporary selection starting position memory area 13d is set to "unselected." If the selection status flag for this image file is "unselected" (S6: YES), then in S7 the CPU 11 changes selection status flags for all image files corresponding to display position numbers stored in the temporary selection list memory area 13c to "selected" in the thumbnail list stored in the thumbnail list memory area 13b. However, if the selection status flag for the image file corresponding to the display position number stored in the temporary selection starting position memory area 13d is set to "selected" (S6: NO), in S8 the CPU 11 changes the selection status flags for all image files corresponding to display position numbers stored in the temporary selection list memory area 13c to "unselected" in the thumbnail list stored in the thumbnail list memory area 13b. Subsequently, the CPU 11 returns to S3 and repeats the process in S3-S8 described above.

If the CPU 11 determines in S4 that the position of the user's finger on the touch panel 17 does not correspond to a display position of a thumbnail on the LCD 16 (S4: NO), then the CPU 11 skips S5-S8 and advances to S9. In S9 the CPU 11 determines whether the Cancel button 15b of the operation keys 15 has been pressed. If the Cancel button 15b has been pressed (S9: YES), the CPU 11 ends the printing process. However, if the Cancel button 15b has not been pressed (S9: NO), in S10 the CPU 11 determines whether the Print button 15c has been pressed.

If the CPU 11 determines that the Print button 15c has been pressed (S10: YES), in S11 the CPU 11 reads image files having a selection status flag set to "selected" in the thumbnail list stored in the thumbnail list memory area 13b from the memory card 22a, stores these image files in the image memory area 13a, controls the printer 21 to print an image of each file on printing paper, and subsequently ends the printing process. However, if the Print button 15c has not been pressed (S10: NO), the CPU 11 returns to S3 and repeats the process in S3-S10 described above.

Through the printing process of FIG. 4 described above, the user can select or deselect all image files within the range specified by sliding a finger over the thumbnails through a simple operation of sliding a finger over thumbnails displayed on the LCD 16 and then lifting the finger therefrom.

Specifically, if the selection status flag of the image file corresponding to the first touched thumbnail is "unselected," selection status flags for all image files within the range specified by sliding a finger over the thumbnails are set to "selected." If the selection status flag for the image file corresponding to the first touched thumbnail is "selected" initially, then selection status flags for all image files within the specified range are set to "unselected." In other words, the selection status flags for all image files within the range specified by the user's sliding finger are set based on the selection status flag for the image file corresponding to the first touched thumbnail, enabling the user to perform the process through a simple, easy-to-understand operation.

The CPU 11 may check the selection status flags for the image files corresponding to the thumbnails touched by the user's finger before starting the temporary selection process of S5 and determines in advance whether the image file corresponding to the thumbnail to which the user slides the user's finger is selected or deselected so that the CPU 11 simply may follow the outcome of the determination in S6.

Alternatively, the CPU 11 may check the selection status flags for the image files corresponding to the thumbnails touched by the user's finger before starting the temporary selection process of S5 and the CPU 11 may execute a routine for selecting the image file that corresponds to the thumbnail touched at the touch panel 17 (S5, S7) if the selection status flag for the image file is "unselected", whereas the CPU 11 may execute a routine for deselecting the image file that corresponds to the thumbnail touched at the touch panel 17 (S5, S8) if the selection status flag for the image file is "selected."

Next, a method of operating the touch panel 17 will be described with reference to FIGS. 6A-8D. First, a method of selecting image files in which the user traces a path over thumbnails while touching the touch panel 17 will be described with reference to FIGS. 6A-7B.

Figure 6A:
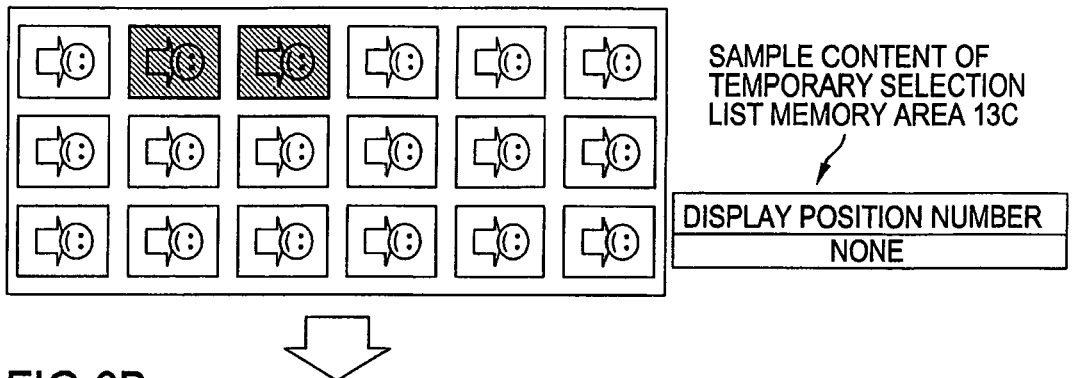
FIGS. 6A-6D are explanatory diagrams illustrating a method of selecting image files by touching a touch panel and tracing a path over thumbnails displayed on the LCD.

FIGS. 6A-6D are explanatory diagrams illustrating a method in which the user selects image files by touching the touch panel 17 with a finger and tracing the finger over thumbnails. FIGS. 7A-7B conceptually illustrate the content of the thumbnail list memory area 13b that changes according to the operation shown in FIGS. 6A-6D.

When the user presses the Print Image File button 15a of the operating keys 15 while a memory card 22a storing image files is inserted into one of the memory card slots 22, thumbnails for the image files stored in the memory card 22a are displayed on the LCD 16. In this description, it will be assumed that the thumbnail list memory area 13b stores the thumbnail list shown in FIG. 7A. Accordingly, thumbnails for image files corresponding to display position numbers "A1-C6" in the thumbnail list are displayed at display position numbers "A1-C6" on the LCD 16. Since the selection status flags of the image files corresponding to the display position numbers "A2" and "A3" in the thumbnail list are set to "selected" while the remaining selection status flags are set to "unselected." Therefore, only the thumbnails with the display position numbers "A2, A3" are in unselected state while the remaining thumbnails are in selected state as shown in FIG. 6A.

Figure 6B:
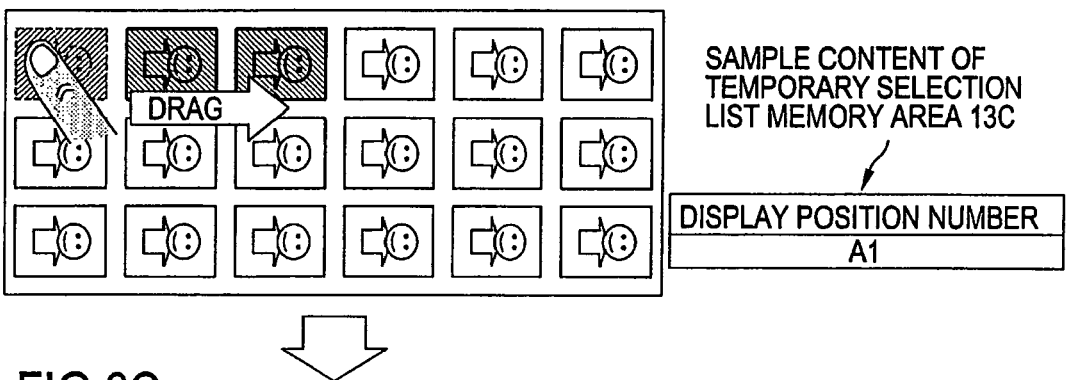
Figure 7A:
FIGS. 7A-7B are tables showing the content of the thumbnail list memory area modified according to the operation in FIGS. 6A-6D.
Figure 7B:

At this time the user touches the thumbnail corresponding to display position number "A1", as shown in FIG. 6B. Accordingly, the display position number "A1" is stored in both the temporary selection starting position memory area 13d and the temporary selection list memory area 13c. The thumbnail for the image file corresponding to the display position number "A1" stored in the temporary selection list memory area 13c is displayed on the LCD 16 in a temporarily selected state, as shown in FIG. 6B.

Figure 6C:
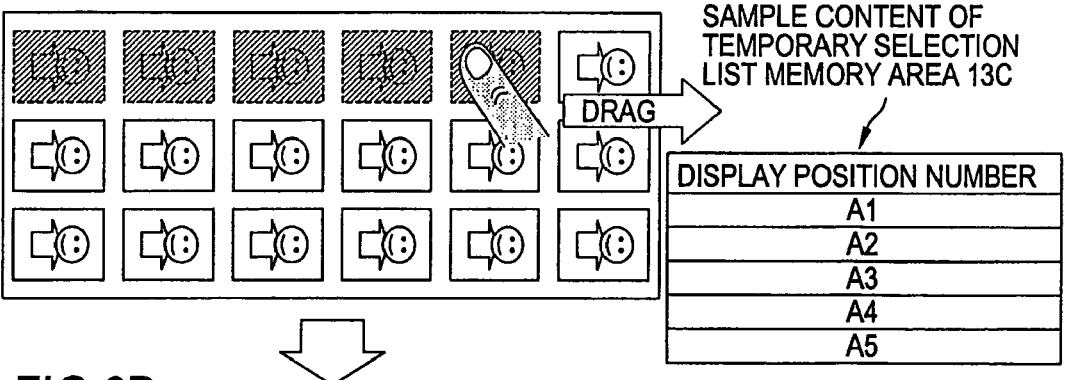

Next, the user moves the finger rightward on the display screen, while the finger remains in contact with the touch panel 17, so as to touch the thumbnails from the display position number "A1" to the display position number "A5" as shown in FIG. 6C. Consequently, all the display position numbers "A1-A5" of the touched thumbnails are stored in the temporary selection list memory area 13c.

Therefore, as shown in FIG. 6C, the thumbnails for the image files that correspond to the display position numbers "A1-A5" stored in the temporary selection list memory area 13c are displayed on the LCD 16 in a temporarily selected state. Since the selected thumbnails remain displayed on the LCD 16 in the temporarily selected state while the user's finger remains in contact with the touch panel 17, the user can easily visualize which image files are selected.

Figure 6D:
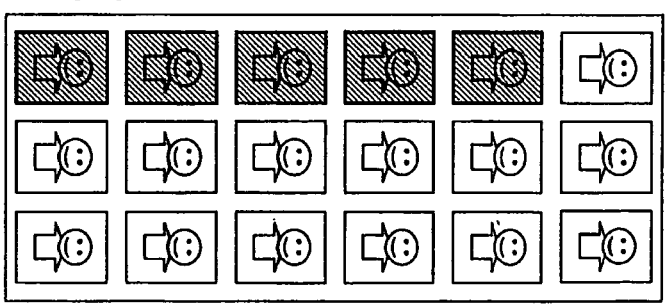

If the user lifts the finger from the touch panel 17 at this time, all selection status flags for lines having display position numbers "A1-A5" in the temporary selection list memory area 13c are set to "selected" in the thumbnail list, as shown in FIG. 7B, because the selection status flag is set to "unselected" in the line having position display number "A1" stored in the temporary selection starting position memory area 13d. Consequently, thumbnails for image files having a selection status flag set to "selected" are displayed on the LCD 16 in the selected state, as shown in FIG. 6D.

In the first embodiment described above, the user can select image files corresponding to all traced thumbnails by performing a simple operation (single operation) of tracing the user's finger over a plurality of thumbnails displayed on the LCD 16. If the selection status flag of the image file corresponding to the first touched thumbnail image is "unselected," selection status flags for all image files within the range specified by sliding a finger over the thumbnails are set to "selected," enabling the user to perform the process through a simple, easy-to-understand operation.

FIGS. 8A-8D are explanatory diagrams conceptually illustrating the method of changing the "selected" setting of the selection status flag to "unselected" for image files corresponding to thumbnails displayed on the LCD 16 by sliding a finger over these thumbnails on the touch panel 17.

Figure 8A:
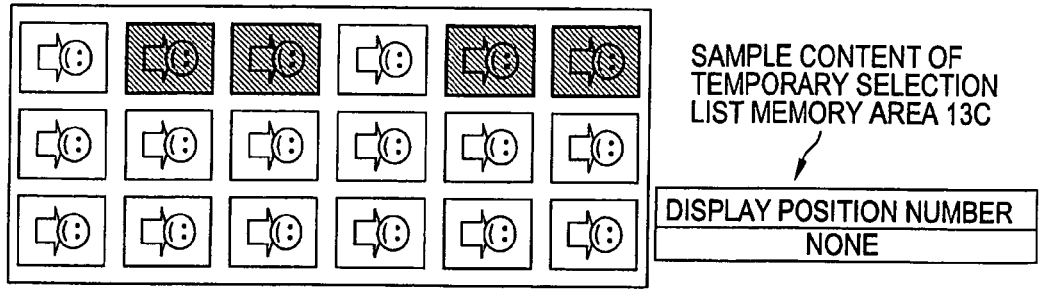
FIGS. 8A-8D are explanatory diagrams illustrating a method of changing the selection status flag for image files from "selected" to "unselected" by touching the touch panel and tracing a path over thumbnails displayed on the LCD.

FIGS. 8A-8D are explanatory diagrams illustrating a method of changing the selection status flag for image files from "selected" to "unselected" by touching the touch panel 17 and tracing a path over thumbnails displayed on the LCD 16. As shown in FIG. 8A, the selection status flags for image files corresponding to thumbnails displayed at display position numbers "A2, A3, A5, and A6" are set to "selected," resulting in these thumbnails being displayed in the selected state on the LCD 16.

Figure 8B:
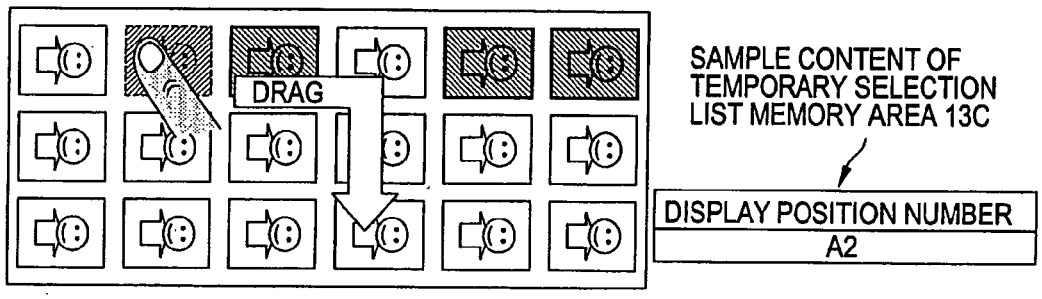

If the user touches the touch panel 17 at a position corresponding to the thumbnail at display position number "A2" at this time, as shown in FIG. 8B, display position number "A2" is stored in both the temporary selection starting position memory area 13d and the temporary selection list memory area 13c. Consequently, the thumbnail for the image file corresponding to the display position number "2" stored in the temporary selection list memory area 13c is displayed in a temporarily selected state on the LCD 16, as shown in FIG. 8B.

Figure 8C:
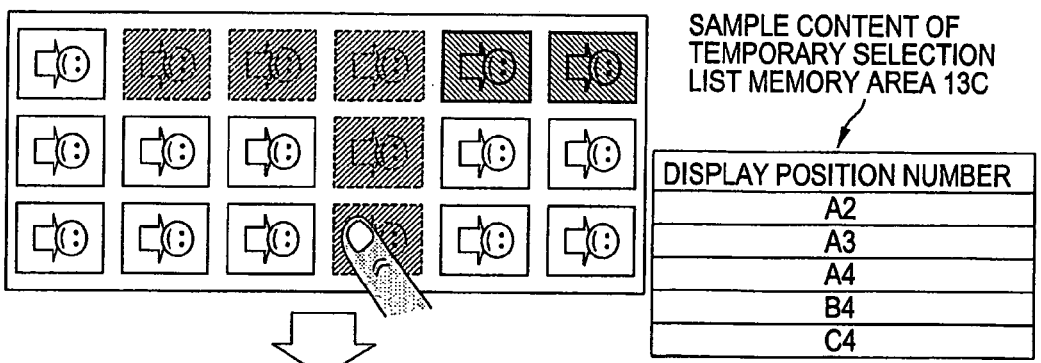

Next, while a keeping the finger in contact with the touch panel 17, the user slides the finger rightward over the touch panel 17 to touch the thumbnails of the display position numbers "A2-A4" and further slides the finger downward over the touch panel 17 to touch the thumbnails of the display position numbers "A4-C4," as shown in FIG. 8C. At this time, the display position numbers "A2-A4, B4, and C4" for the touched thumbnails are stored in the temporary selection list memory area 13c.

Consequently, the thumbnails for image files corresponding to the display position numbers "A2-A4, B4, and C4" stored in the temporary selection list memory area 13c are displayed on the LCD 16 in the temporarily selected state, as shown in FIG. 8C.

Figure 8D:
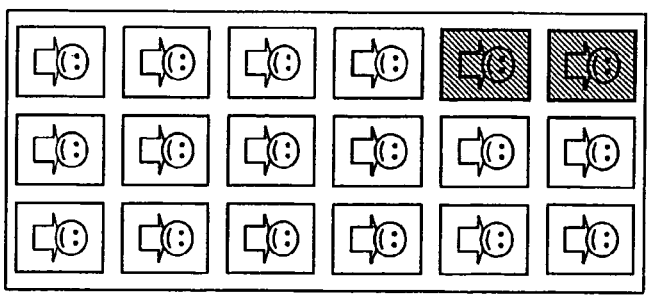

If the user lifts the finger from the touch panel 17 at this time, all selection status flags of the image files for the display position numbers "A2-A4, B4, and C4" stored in the temporary selection list memory area 13c are set to "unselected" in the thumbnail list since the selection status flag for display position number "A2" stored in the temporary selection starting position memory area 13d is "selected" in the thumbnail list. Consequently, the thumbnails for these image files having selection status flags now set to "unselected" are displayed on the LCD 16 in the unselected state, as shown in FIG. 8D.

As described above, the user can deselect image files corresponding to all traced thumbnails by performing a simple operation (single operation) of tracing the user's finger over a plurality of thumbnails displayed on the LCD 16. If the selection status flag of the image file corresponding to the first touched thumbnail image is "selected," selection status flags for all image files within the range specified by sliding a finger over the thumbnails are set to "unselected," enabling the user to perform the process through a simple, easy-to-understand operation.

In the first embodiment described above, the user can deselect image files corresponding to all traced thumbnails by performing a simple operation (single operation) of tracing the user's finger over a plurality of thumbnails displayed on the LCD 16 and lifting the user's finger therefrom.

Specifically, if the selection status flag of the image file corresponding to the first touched thumbnail image is "unselected," selection status flags for all image files within the range specified by sliding a finger over the thumbnails are set to "selected." If the selection status flag for the image file corresponding to the first touched thumbnail is "selected" initially, then selection status flags for all image files within the specified range are set to "unselected." In other words, the selection status flags for all image files within the range specified by the user's sliding finger are set based on the selection status flag for the image file corresponding to the first touched thumbnail. The user is not required to determine whether each of all image files within the range specified by the user's sliding finger is selected or deselected, enabling the user to perform the process through a simple, easy-to-understand operation.

Next, a MFP 31 according the second embodiment of the present invention will be described. In this second embodiment, ordinal numbers are assigned to display position numbers in advance. For example, the display position numbers are assigned in order from "A1" to "A6", "A1" being the leading display position number, followed by "B1" to "B6", followed by "C1" to "C6". Then, the user performs a simple operation to individually specify two thumbnails by touching two thumbnails displayed on the LCD 16. Through this simple operation, the user can specify all image files having display position numbers ranging sequentially from the display position number for the image file corresponding to the first touched thumbnail to the display position number for the image file corresponding to the next touched thumbnail in order to select or deselect all image files within this range.

Figure 12A:
FIGS. 12A-12B are tables showing the content of the thumbnail list memory area modified according to the operation in FIGS. 11A-11D.
Figure 12B:
Figure 12C:
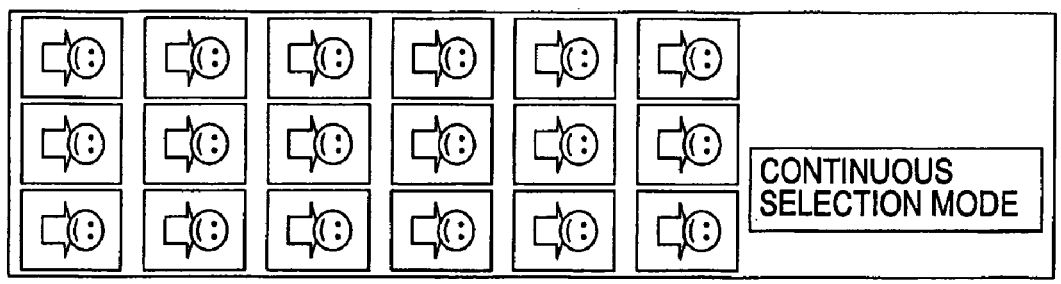
FIG. 12C is an explanatory diagram illustrating a continuous selection mode button displayed on the LCD according to a modification to the second embodiment.
Figure 12D:
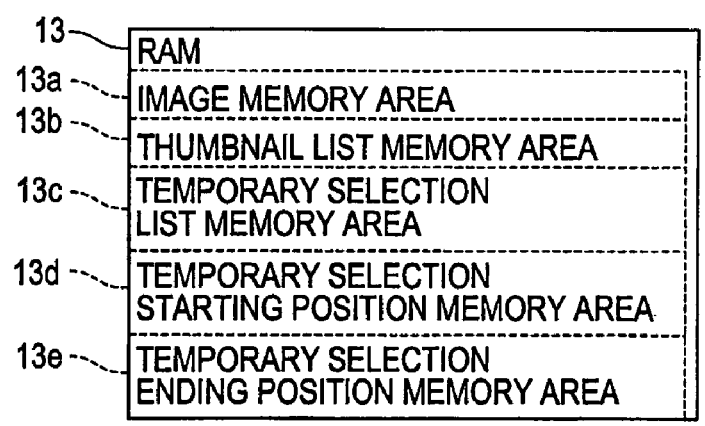
FIG. 12D is a block diagram showing the electrical structure of a RAM of the multifunction peripheral according to the second embodiment.

Next, the electrical structure of the MFP 31 will be described with reference to FIG. 12D. FIG. 12D is a block diagram showing the electrical structure of the RAM 13 in the MFP 31. Since the block diagram of the MFP 31 of the second embodiment differs from the block diagram of the MFP 1 of the first embodiment (see FIG. 2) only in terms of the RAM 13, only the RAM 13 will be described below and the description of the components of the second embodiment that are same as those of the first embodiment will be omitted.

The RAM 13 of the second embodiment includes a temporary selection list memory area 13c for storing display position numbers of the thumbnails that are identified when the user touches the touch panel 17 in a continuous selection process (see FIG. 10) as a temporary selection list, a temporary selection starting position memory area 13d for storing a display position number of a thumbnail initially identified in the continuous selection process, and a temporary selection ending position memory area 13e for storing a display position number of a thumbnail last identified in the continuous selection process in addition to the image memory area 13a and the thumbnail list memory area 13b shown in FIG. 2.

Next, the printing process executed by the CPU 11 of the MFP 31 according to the second embodiment will be described with reference to FIG. 9. FIG. 9 is a flowchart illustrating steps in this printing process and is executed when the user presses the Print Image File button 15a while a memory card 22a is inserted into one of the memory card slots 22.

In this printing process, the user can select desired image files from those stored in the memory card 22a through simple operations and can direct the printer 21 to print images on printing paper based on the selected image files.

Figure 11A:
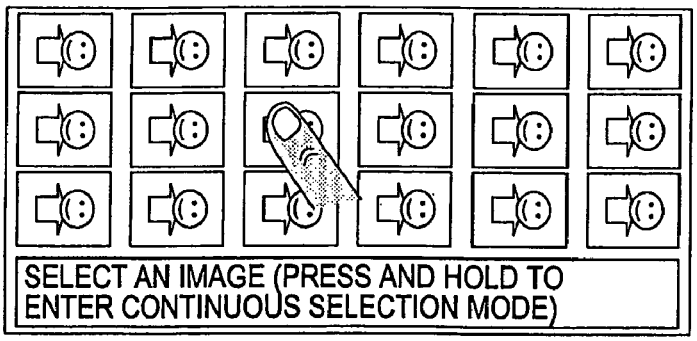
FIG. 11 is an explanatory diagram illustrating a method of selecting image files by individually touching two thumbnails displayed on the LCD.

As with the printing process shown in FIG. 4, in the printing process, the CPU 11 initializes the thumbnail list memory area 13b in S31, creates a thumbnail list, and stores the thumbnail list in the thumbnail list memory area 13b in S32. In S33 the CPU 11 displays the message "Select an image (press and hold to enter the continuous selection mode)" in the bottom of the display on the LCD 16, as shown in FIG. 11A. Then, as with the printing process shown in FIG. 4, in S44 the CPU 11 displays thumbnails on the LCD 16 for image files of the thumbnail list and sets each thumbnail to the selected state or the unselected state.

In S35 the CPU 11 determines whether the position of the user's finger touching the touch panel 17 is a display position on the LCD 16 for displaying a thumbnail. If the position of the user's finger on the touch panel 17 is a display position for a thumbnail (S35: YES), in S36 the CPU 11 identifies the display position number of the thumbnail displayed at the display position on the LCD 16 matching the position of the user's finger on the touch panel 17.

However, if the position of the user's finger does not correspond to the display position for a thumbnail (S35: NO), the CPU 11 skips S36-S41 and advances to S42.

In S37 the CPU 11 determines whether the user's finger has touched the thumbnail at the display position number identified in S36 for at least a prescribed interval (1 second, for example). If the user's finger has not continually touched this thumbnail for a period exceeding the prescribed interval (S37: NO), in S38 the CPU 11 determines whether the selection status flag of the image file corresponding to the display position number identified in S36 is "unselected."

If the selection status flag for the image file corresponding to the identified display position number is "unselected" (S38: YES), in S39 the CPU 11 changes the selection status flag for this image file to "selected." However, if the selection status flag is not "unselected" (S38: NO), then in S40 the CPU 11 changes the selection status flag for this image file to "unselected." Subsequently, the CPU 11 returns to S34 and repeats the process in S34-S40 described above.

On the other hand, if the CPU 11 determines in S37 that the user's finger has touched the thumbnail at the display position number identified in S36 for a period exceeding the prescribed interval (S37: YES), then the CPU 11 executes a continuous selection process in S41.

Figure 10:
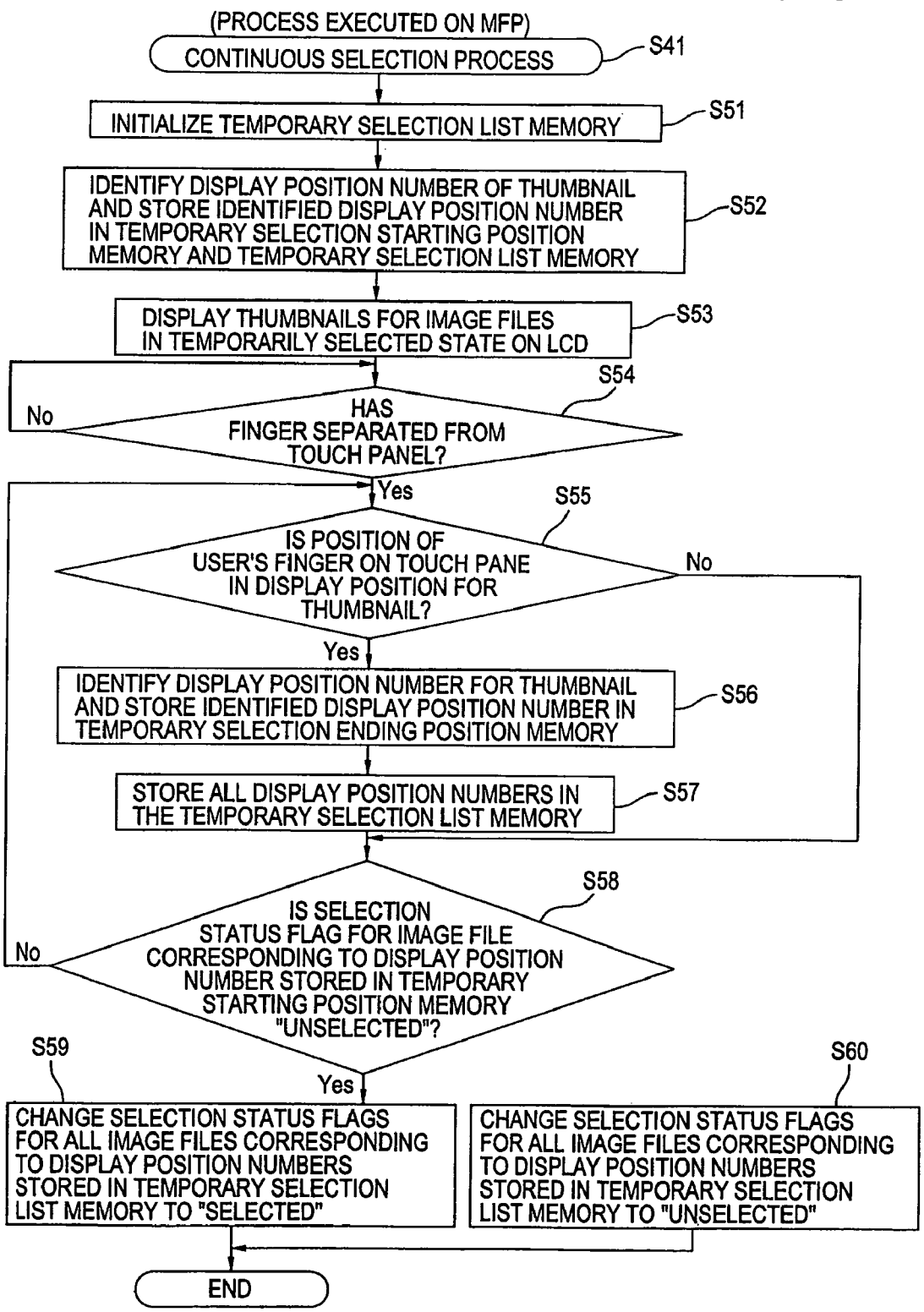
FIG. 10 is a flowchart illustrating steps in a continuous selection process executed on the multifunction peripheral.

Here, the continuous selection process of S41 will be described with reference to FIG. 10. FIG. 10 is a flowchart illustrating steps in the continuous selection process of S41. This process serves to determine a sequential range of display position numbers from the display position number corresponding to the thumbnail touched by the user for the prescribed interval to a display position number corresponding to a thumbnail directly touched by the user after first removing the finger from the touch panel 17, and to change the selection status flags for all image files corresponding to the display position numbers in the determined range to "selected" or "unselected."

In S51 at the beginning of the continuous selection process, the CPU 11 initializes the temporary selection list memory area 13c. In S52 the CPU 11 identifies the display position number of the thumbnail displayed at the display position on the LCD 16 identical to the position of the user's finger on the touch panel 17 and stores the identified display position number in both the temporary selection starting position memory area 13d and the temporary selection list memory area 13c. In S53 the CPU 11 sets the thumbnail of the image file corresponding to the display position number stored in the temporary selection list memory area 13c to the temporarily selected state on the LCD 16.

In S54 the CPU 11 waits as long as the user's finger has not separated from the touch panel 17 (S54: NO). When the user's finger has separated from the touch panel 17 (S54: YES), in S55 the CPU 11 determines whether the position of the user's finger on the touch panel 17 after the finger separated from the touch panel 17 and subsequently touched the touch panel 17 corresponds to a display position for a thumbnail. Then, the CPU 11 waits as long as the user's finger has not touched the touch panel 17 corresponds to a display position for a thumbnail (S55: NO).

However, if the position of the user's finger on the touch panel 17 corresponds to a display position for a thumbnail (S55: YES), then in S56 the CPU 11 identifies the display position number of the thumbnail displayed at a display position on the LCD 16 matching the position of the user's finger on the touch panel 17 and stores the identified display position number in the temporary selection ending position memory area 13e.

In S57 the CPU 11 stores in the temporary selection list memory area 13c all display position numbers in a continuous range from the display position number stored in the temporary selection starting position memory area 13d to the display position number stored in the temporary selection ending position memory area 13e. In S58 the CPU 11 determines whether the selection status flag of the image file corresponding to the display position number stored in the temporary selection starting position memory area 13d is set to "unselected."

If the selection status flag for this image file is "unselected" (S58: YES), then in S59 the CPU 11 changes selection status flags for all image files corresponding to the display position numbers stored in the temporary selection list memory area 13c to "selected" in the thumbnail list stored in the thumbnail list memory area 13b. However, if the selection status flag for the image file corresponding to the display position number stored in the temporary selection starting position memory area 13d is set to "selected" (S71: NO), then in S73 the CPU 11 changes the selection status flags for all image files corresponding to the display position numbers stored in the temporary selection list memory area 13c to "unselected" in the thumbnail list stored in the thumbnail list memory area 13b. Subsequently, the CPU 11 ends the continuous selection process of S41.

Through the continuous selection process of S41 described with reference to FIG. 10, the MFP 31 can determine a sequential range of display position numbers from the display position number corresponding to the thumbnail touched by the user for the prescribed interval to the display position number corresponding to a thumbnail directly touched by the user after first removing the finger from the touch panel 17, and can change the selection status flags for all image files corresponding to the display position numbers in the determined range to "selected" or "unselected." After completing the continuous selection process of S41, the CPU 11 returns to S34 in FIG. 9 and repeats the process of S34-S41 in FIG. 9.

In S42 of FIG. 9, the CPU 11 determines whether the Cancel button 15b of the operation keys 15 has been pressed. If the Cancel button 15b has been pressed (S42: YES), the CPU 11 ends the printing process. However, if the Cancel button 15b has not been pressed (S42: NO), in S43 the CPU 11 determines whether the Print button 15c has been pressed.

If the CPU 11 determines that the Print button 15c has been pressed (S43: YES), in S44 the CPU 11 reads image files having a selection status flag set to "selected" in the thumbnail list stored in the thumbnail list memory area 13b from the memory card 22a, stores these image files in the image memory area 13a, controls the printer 21 to print an image of each file on printing paper, and subsequently ends the printing process. However, if the Print button 15c has not been pressed (S43: NO), the CPU 11 returns to S34 and repeats the process in S34-S43 described above.

Through the printing process of FIG. 9 described above, selection status flags for all image files within the specified range are set to "selected" if the selection status flag for the image file corresponding to the first touched thumbnail was set to "unselected," and to "unselected" if the selection status flag for the image file corresponding to the first touched thumbnail was "selected." Therefore, this operation is simple and easy to understand for the user since selection status flags of all image files within the specified range are set based on the selection status flag of the image file corresponding to the first touched thumbnail.

The CPU 11 may check the selection status flags for the image files corresponding to the thumbnails continually touched by the user's finger for a period exceeding the prescribed interval before starting the continuous selection process of S41 and determines in advance whether the image files within the specified range in the continuous selection process is selected or deselected so that the CPU 11 simply may follow the outcome of the determination in S58.

Alternatively, the CPU 11 may check the selection status flags for the image files corresponding to the thumbnails continually touched by the user's finger for a period exceeding the prescribed interval before starting the continuous selection process of S41 and the CPU 11 may execute a routine for selecting the image files within the specified range in the continuous selection process (S53-S57, S59) if the selection status flag for the image file is "unselected", whereas the CPU 11 may execute a routine for deselecting the image files within the specified range in the continuous selection process (S53-S57, S60) if the selection status flag for the image file is "selected."

Next, a method of operating the touch panel 17 according to the second embodiment will be described with reference to FIGS. 11A-12C.

Figure 11B:
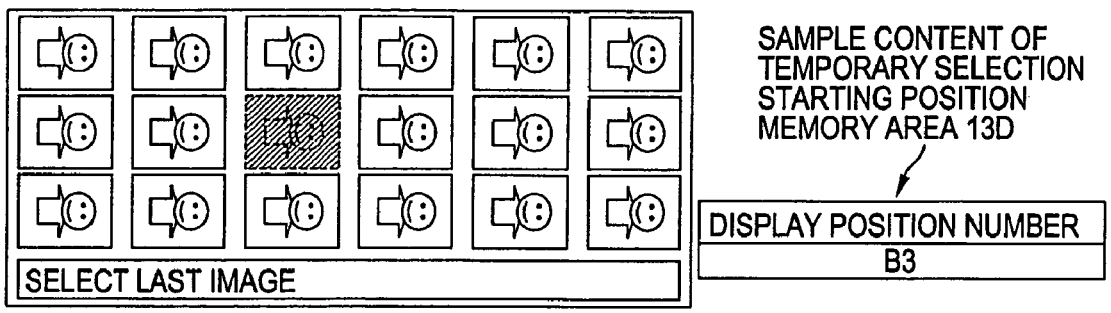

FIGS. 11A-11D are explanatory diagrams illustrating a method in which the user selects image files by touching two individual thumbnails displayed on the LCD 16 with a finger. FIGS. 12A and 12B conceptually illustrate the content of the thumbnail list memory area 13b that changes according to the operation shown in FIGS. 11A-11D.

The following description assumes that the thumbnail list shown in FIG. 12A is stored in the thumbnail list memory area 13b. Since all selection status flags of the thumbnail list set to "unselected" as shown in FIG. 12A, all thumbnails displayed on the LCD 16 are in the unselected state as shown in FIG. 11A.

If the user touches the thumbnail at display position number "B3" for at least a prescribed interval (1 second, for example), as shown in FIG. 11A, the display position number "B3" is stored in both the temporary selection starting position memory area 13d and the temporary selection list memory area 13c. Hence, the thumbnail for the image file corresponding to the display position number "B3" stored in the temporary selection list memory area 13c is displayed on the LCD 16 in the temporarily selected state, as shown in FIG. 11B.

Figure 11C:
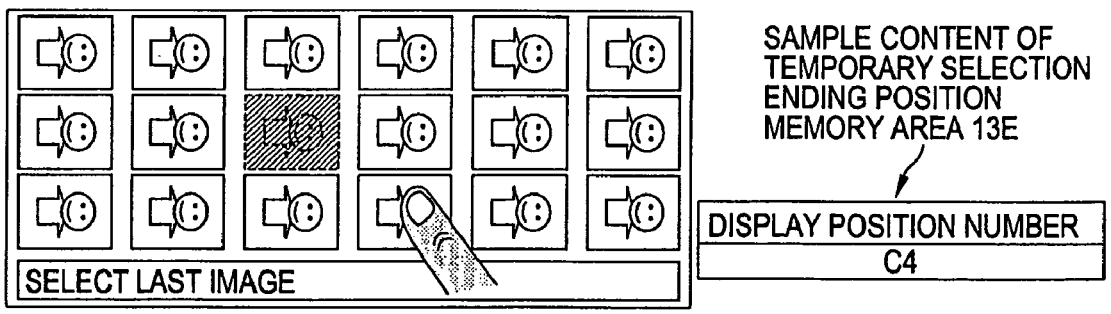

If the user then lifts the finger from the touch panel 17 and subsequently touches the thumbnail at display position number "C4", as shown in FIG. 11C, the display position number "C4" is stored in the temporary selection ending position memory area 13e. Accordingly, display position numbers "B3-B6, C1-C4" from the display position number "B3" stored in the temporary selection starting position memory area 13d to the display position number "C4" stored in the temporary selection ending position memory area 13e are all stored in the temporary selection list memory area 13c.

Figure 11D:
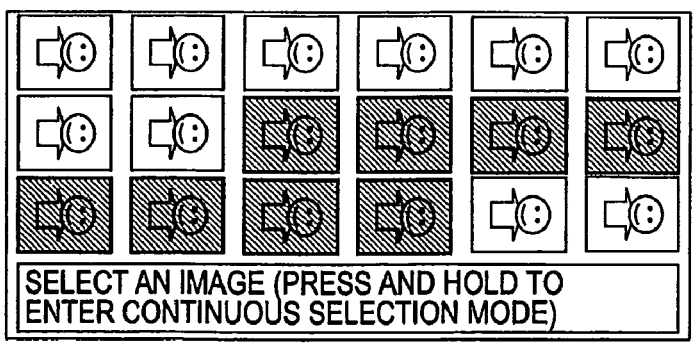

Hence, all selection status flags for the display position numbers "B3-B6, C1-C4" stored in the temporary selection list memory area 13c are set to "selected" in the thumbnail list because the selection status flag for the image file corresponding to the display position number "B3" stored in the temporary selection starting position memory area 13d is set to "unselected" in the thumbnail list. Consequently, thumbnails for image files having a selection status flag set to "selected" are displayed on the LCD 16 in the selected state, as shown in FIG. 11D.

In the second embodiment described above, the user can perform a simple operation to touch two thumbnails individually among the thumbnails displayed on the LCD 16 to specify image files for all display position numbers ranging sequentially from the display position number of the image file corresponding to the first touched thumbnail to the display position of the image file corresponding to the next touched thumbnail in order to select or deselect all image files within the specified range.

Here, selection status flags for all image files within the specified range are set to "selected" when the selection status flag of the image file corresponding to the first touched thumbnail is "unselected" and set to "unselected" when the selection status flag of the image file corresponding to the first touched thumbnail is "selected." In other words, the selection status flags of image files within the specified range are set based on the setting of the selection status flag associated with the image file corresponding to the first touched thumbnail, thereby making the operation simpler and more user-friendly.

While the invention has been described in detail with reference to specific embodiments thereof, it would be apparent to those skilled in the art that many modifications and variations may be made therein without departing from the spirit of the invention, the scope of which is defined by the attached claims.

For example, in the second embodiment described above, the continuous selection process of S41 shown in FIG. 10 is executed when the user presses and holds an initial thumbnail among thumbnails displayed on the LCD 16. However, as shown in FIG. 12C, it is also possible to provide a Continuous Selection Mode button on the display and execute the continuous selection process of S41 when the user touches this Continuous Selection Mode button. In the continuous selection process in this case, all image files having display position numbers ranging in succession from the display position number for the image file corresponding to the first touched thumbnail to the display position number for the image file corresponding to the next touched thumbnail are specified and all specified image files are selected or deselected.

Further, in the first embodiment described above, thumbnails for user-selected image files remain displayed on the LCD 16 in the temporarily selected state while the user's finger is in contact with the touch panel 17. However, two types or patterns of temporarily selected states may be used so that the user can visually determine whether the image files are selected or unselected. In other words, the style of the temporarily selected state of thumbnails displayed on the touch panel 17 is switched based on the selection status flag setting for the image file corresponding to the first touched thumbnail.

In both the first and second embodiments described above, image data stored in the memory card 22a is used as the target of selection, but the user may also select image data generated by the scanner 20 or image data acquired from a PC, external hard drive, or the like.

Further, while the MFP 1 having an image-selecting device was described in the first and second embodiments, the image-selecting device of the present invention is not limited to that in a multifunction peripheral. The present invention may also be applied to an image-selecting device provided in a digital still camera or the like.

Instead of the display position number, the file name of the image file corresponding to the display position number may be stored in the temporary selection starting position memory 13d so that the selection status of the selection status flag of the image file corresponding to the temporary selection starting position may be referred based on the file name.

The selection status of the selection status flag of the image file that corresponds to the thumbnail that the user touches before the temporary selection process is started may be stored and directly referred to.

What is claimed is:

1. An image-selecting device comprising:
    a storing unit that stores a plurality of pieces of image data;
    a displaying unit that displays a plurality of images based on the plurality of pieces of image data and has a plurality of display regions for each of the plurality of images;
    a detecting unit that detects each of the plurality of display regions receiving direct input by an indicator;
    a reading unit that reads the plurality of pieces of image data from the storing unit;
    a display controlling unit that controls the displaying unit to display the plurality of images;
    an image data identifying unit that identifies at least two pieces of image data for the images displayed in the display regions detected by the detecting unit;
    an image data selecting unit that selects or deselects the at least two pieces of image data identified by the image data identifying unit;
    a selection data storing unit that stores selection data for each of the plurality of pieces of image data read by the reading unit, the selection data indicating whether each of the plurality of pieces of image data is in a selected state or a deselected state by the image data selecting unit; and
    a determining unit that determines whether first image data firstly identified by the image data identifying unit among the at least two pieces of image data is in the selected state or the deselected state based on the selection data,
    wherein the selected state or the deselected state of the at least two pieces of image data is set based only on the first image data, such that the image data selecting unit sets the at least two image data to the selected state when the determining unit determines that the first image data is in the deselected state, and sets the at least two image data to the deselected state when the determining unit determines that the first image data is in the selected state.

2. The image-selecting device according to claim 1,
    wherein the detecting unit detects a display region corresponding to a position of direct input from the indicator on the displaying unit when the position of direct input moves on the displaying unit;
    wherein the determining unit determines whether the first image data is in the selected state or the deselected state while the indicator continually applies direct input to the displaying unit; and
    wherein the image data selecting unit sets, while the indicator continually applies direct input to the displaying unit, the at least two image data to the selected state when the determining unit determines that the first image data is in the deselected state, and sets the at least two image data to the deselected state when the determining unit determines that the one image data is in the selected state.

3. The image-selecting device according to claim 1, further comprising an identification data storing unit that stores identification data for identifying the plurality of pieces of image data and assigns a prescribed order to the identification data;
    wherein the display controlling unit controls the displaying unit to display the plurality of images corresponding to the plurality of pieces of image data according to the prescribed order;
    wherein the at least two pieces of image data further include a second image data lastly identified by the image data identifying unit; and
    wherein the image data selecting unit sets the first image data, the second image data, and image data between the first image data and the second image data according to the prescribed order of the identification data to the selected state when the determining unit determines that the first image data is in the deselected state, and sets the first image data, the second image data, and image data between the first image data and the second image data according to the prescribed order of the identification data to the deselected state when the determining unit determines that the first image data is in the selected state.

4. A computer-readable storage medium storing a computer-executable image-selecting program for an image-selecting device, the image-selecting device comprising a storing unit that stores a plurality of pieces of image data, a displaying unit that displays a plurality of images based on the plurality of pieces of image data and has a plurality of display regions for each of the plurality of images, and a detecting unit that detects each of the plurality of display regions receiving direct input by an indicator, the image-selecting program comprising:
    instructions for reading the plurality of pieces of image data from the storing unit;
    instructions for controlling the displaying unit to display the plurality of images;
    instructions for identifying at least two pieces of image data for the images displayed in the display regions detected by the detecting unit;

instructions for selecting or deselecting the at least two pieces of image data identified in the identifying instructions;

instructions for storing selection data for each of the plurality of pieces of image data read in the plurality of pieces of image data reading instructions, the selection data indicating whether each of the plurality of pieces of image data is in a selected state or a deselected state in the selecting or deselecting instructions; and instructions for determining whether first image data firstly identified by the identifying instructions among the at least two pieces of image data is in the selected state or the deselected state based on the selection data, wherein the selected state or the deselected state of the at least two pieces of image data is set based only on the first image data, such that the selecting or deselecting instructions sets the at least two image data to the selected state when the determining instructions determines that the first image data is in the unselected state, and sets the at least two image data to the unselected state when the determining instructions determines that the first image data is in the selected state.

* * * * *